(12) United States Patent
Horn

(10) Patent No.: US 7,278,533 B2
(45) Date of Patent: Oct. 9, 2007

(54) VEHICLE MODULAR BELT CONVEYOR

(76) Inventor: Michael E. Horn, 2 Linden St., Great Neck, NY (US) 11021

( * ) Notice: Subject to any disclaimer, the term of this patent is extended or adjusted under 35 U.S.C. 154(b) by 90 days.

(21) Appl. No.: 11/066,367

(22) Filed: Feb. 25, 2005

(65) Prior Publication Data

US 2006/0191773 A1  Aug. 31, 2006

(51) Int. Cl.
B65G 15/00  (2006.01)
(52) U.S. Cl. .................... 198/817; 198/626.1
(58) Field of Classification Search ............ 198/626.1, 198/817, 606, 465.3, 803.2
See application file for complete search history.

(56) References Cited

U.S. PATENT DOCUMENTS

| | | | | |
|---|---|---|---|---|
| 2,945,604 A | * | 7/1960 | Kroll et al. ................. | 414/254 |
| 3,037,223 A | * | 6/1962 | Lovsey ...................... | 15/53.3 |
| 3,071,016 A | * | 1/1963 | Kroll et al. .................. | 74/102 |
| 3,260,219 A | * | 7/1966 | Vani ......................... | 104/172.3 |
| 3,526,193 A | * | 9/1970 | Vani ......................... | 104/172.3 |
| 3,596,606 A | * | 8/1971 | Smith et al. .............. | 104/172.3 |
| 3,613,908 A | * | 10/1971 | Mulitz ....................... | 414/228 |
| 4,064,440 A | * | 12/1977 | Roder ........................ | 378/57 |
| 4,569,308 A | * | 2/1986 | O'Neill et al. .............. | 119/845 |
| 5,240,018 A | * | 8/1993 | Clark et al. ............... | 134/64 R |
| 5,322,156 A | * | 6/1994 | Kakita et al. ............ | 198/463.3 |
| 5,901,398 A | * | 5/1999 | Ishikawa et al. ............. | 15/53.3 |
| 6,176,367 B1 | * | 1/2001 | Patrito ....................... | 198/817 |
| 6,179,109 B1 | * | 1/2001 | Haldimann ............... | 193/35 R |
| 6,234,303 B1 | * | 5/2001 | Gales et al. ................ | 198/817 |
| 6,250,457 B1 | * | 6/2001 | Spurck et al. ............. | 198/845 |
| 6,957,736 B2 | * | 10/2005 | Bonifer et al. ............. | 198/817 |

* cited by examiner

*Primary Examiner*—James R. Bidwell
(74) *Attorney, Agent, or Firm*—Michael Ries

(57) ABSTRACT

A pair of conveyors having a pair of launch conveyors and at least one pair of drive conveyors is disclosed using modular flat belts. The pair of launch conveyors has zero motion, when a vehicle is driven onto the pair of launch conveyors where the vehicle is placed in park. The pair of launch conveyors is activated to a speed in synchronous with the pair of drive conveyers. The vehicle is moved from the pair of launch conveyors to the pair of drive conveyors and proceeds along the flat modular belts.

8 Claims, 5 Drawing Sheets

VEHICLE MODULAR BELT CONVEYOR

TECHNICAL FIELD & BACKGROUND

The present invention generally relates to the field of flat belt modular conveyors to move vehicles. More specifically, the present invention relates to a pair of parallel launch conveyors that meet up with at least one pair of parallel drive conveyors.

There is a constant search in the vehicle moving industry to find new ways to increase worker's safety, increase ease of access to components, allow liquids to disperse quickly, increase portability of equipment, increase ease of installation and reduce damage to vehicles as they are moved along in various applications. The present invention delivers these improvements by providing flat belt arrangements without the chain dollies or cleats of past disclosures and by parking vehicles onto flat modular belts. Having the car in park as the vehicle is moved along by the flat modular belts reduces damage to vehicles and increases worker's safety. With no or lower profile guide rails damage is substantially reduced to a vehicle's wheel caps, tires, ground effects, under side and rims.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF ILLUSTRATIVE EMBODIMENTS

Various aspects of the illustrative embodiments will be described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations are set forth in order to provide a thorough understanding of the illustrative embodiments. However, it will be apparent to one skilled in the art that the present invention may be practiced without the specific details. In other instances, well-known features are omitted or simplified in order not to obscure the illustrative embodiments.

Various operations will be described as multiple discrete operations, in turn, in a manner that is most helpful in understanding the present invention, however, the order of description should not be construed as to imply that these operations are necessarily order dependent. In particular, these operations need not be performed in the order of presentation.

The phrase "in one embodiment" is used repeatedly. The phrase generally does not refer to the same embodiment, however, it may. The terms "comprising", "having" and "including" are synonymous, unless the context dictates otherwise.

Figure 1:
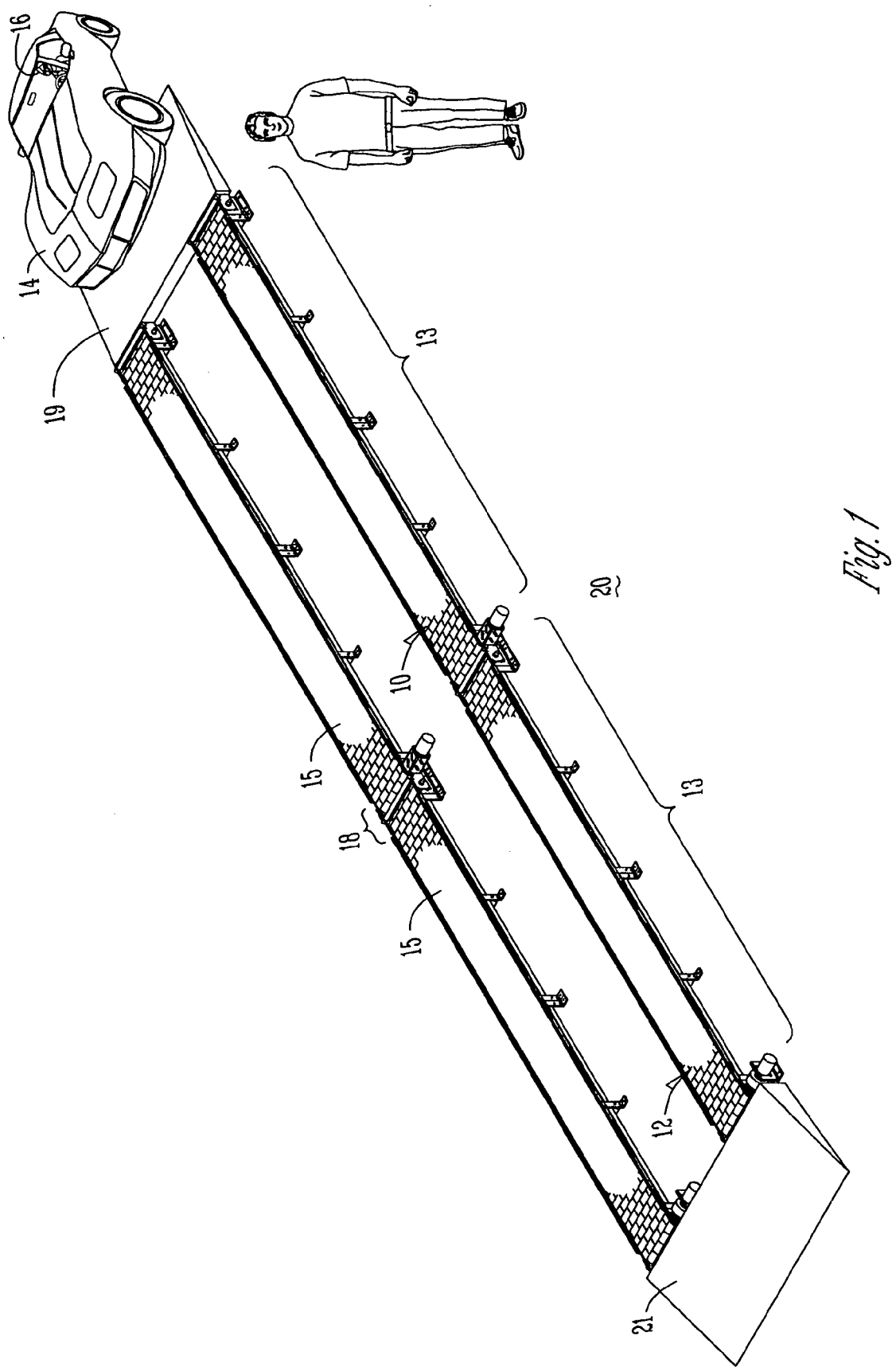
FIG. 1 illustrates a drawing of a vehicle boarding a pair of launch conveyors and at least one pair of drive conveyors, in accordance with one embodiment of the present invention.

Referring now to FIG. 1, illustrated is a pair of launch conveyors 10 and a pair of drive conveyors 12. Both the pair of launch conveyors 10 and the pair of drive conveyors 12 are in modular sections each modular section has a length 13. Length 13 may be 10, 20 or 30 feet. Both the pair of launch conveyors 10 and the pair of drive conveyors 12 have a flat belt 15. A vehicle 14 is driven onto a nonmoving pair of launch conveyors 10 by a worker 16. It is understood that vehicle 14 could driven onto the pair of launch conveyors 10 by the vehicles owner or any other licensed driver. Vehicle 14 is placed in park while on the pair of launch conveyors 10. The pair of launch conveyors 10 is activated to a speed that is in synchronous with the pair of drive conveyors 12. The pair of drive conveyors 12 can be at various speeds and may be at zero speed. The pair of launch conveyors 10 and the pair of drive conveyors 12 are operably coupled by two transfer pair 18. The two transfer pair 18 moves the vehicle 14 from the pair of launch conveyors 10 to the pair of drive conveyors 12. It is understood that there may be at least one pair of drive conveyors 12 and also there may be many pair of drive conveyors 12 coupled together.

In FIG. 1, as in one embodiment a first ramp 19 may be coupled to the pair of launch conveyors 10 to allow the vehicle 16 to load up onto the pair of launch conveyors 10. A second ramp 21 may be coupled to the pair of drive conveyors 12 to allow the vehicle 14 to unload from the pair of drive conveyors 12. First ramp 19 and second ramp 21 may not be needed depending on whether both the pair of launch conveyors 10 and the pair of drive conveyors 12 are recessed below a surface 20. Surface 20 may be a concrete floor in a facility to move cars. Surface 20 may be shaped to receive both the pair of launch conveyors 10 and the pair of drive conveyors 12 and may allow the flat belt 15 to be sufficiently flush with surface 20 to accept vehicle 14 without the first ramp 19 and second ramp 20.

Figure 2:
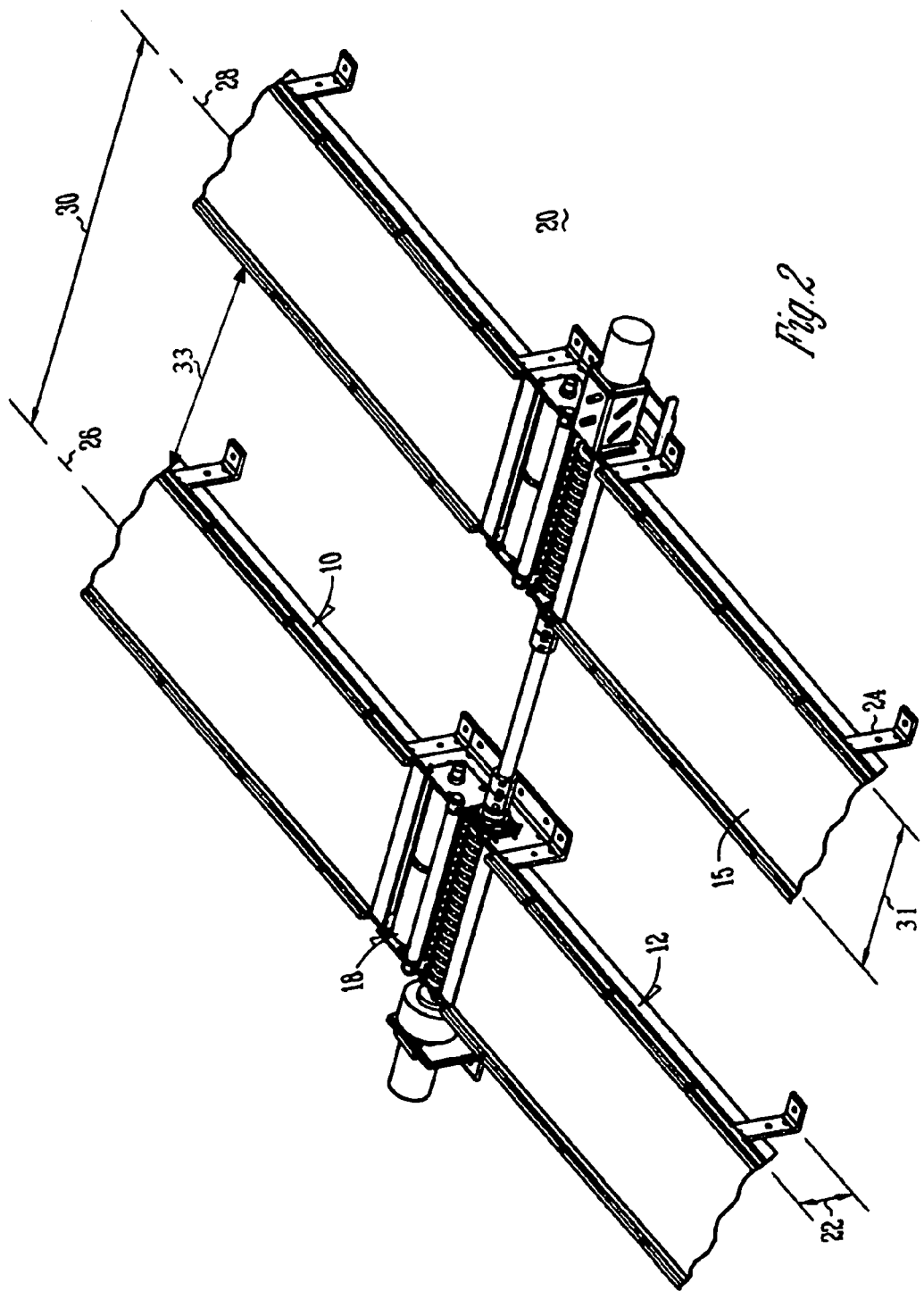
FIG. 2 illustrates a drawing of modular conveyors coupled by two transfer pair, in accordance with one embodiment of the present invention.

Referring to FIG. 2, illustrated is one embodiment of the pair of launch conveyors 10 operably coupled to the pair of drive conveyors 12 by two transfer pair 18. Both pair of launch conveyors 10 and pair of drive conveyors 12 are mounted above or below the surface 20 by a distance 22. Distance 22 may be in a range of 7 to 9 inches above surface 20. Surface 20 may be a flat cement floor of a car wash, oil change shop or any other area needing vehicle 14 movement. Support 24 may by mounted on top of surface 20 or support 24 may be recessed below surface 20. If support 24 is recessed below surface 20 then the distance 22 may be in a range of −2 inches to 7 inches from surface 20. Both the pairs of launch conveyors 10 and drive conveyors 12 have center lines 26 and 28 separated by a center line distance 30. Belt spacing distance 33 is in a range of 20 inches to 36 inches. Each flat belt 15 has a belt width 31 and belt width 31 is in a range of 6 to 20 inches.

Figure 3:
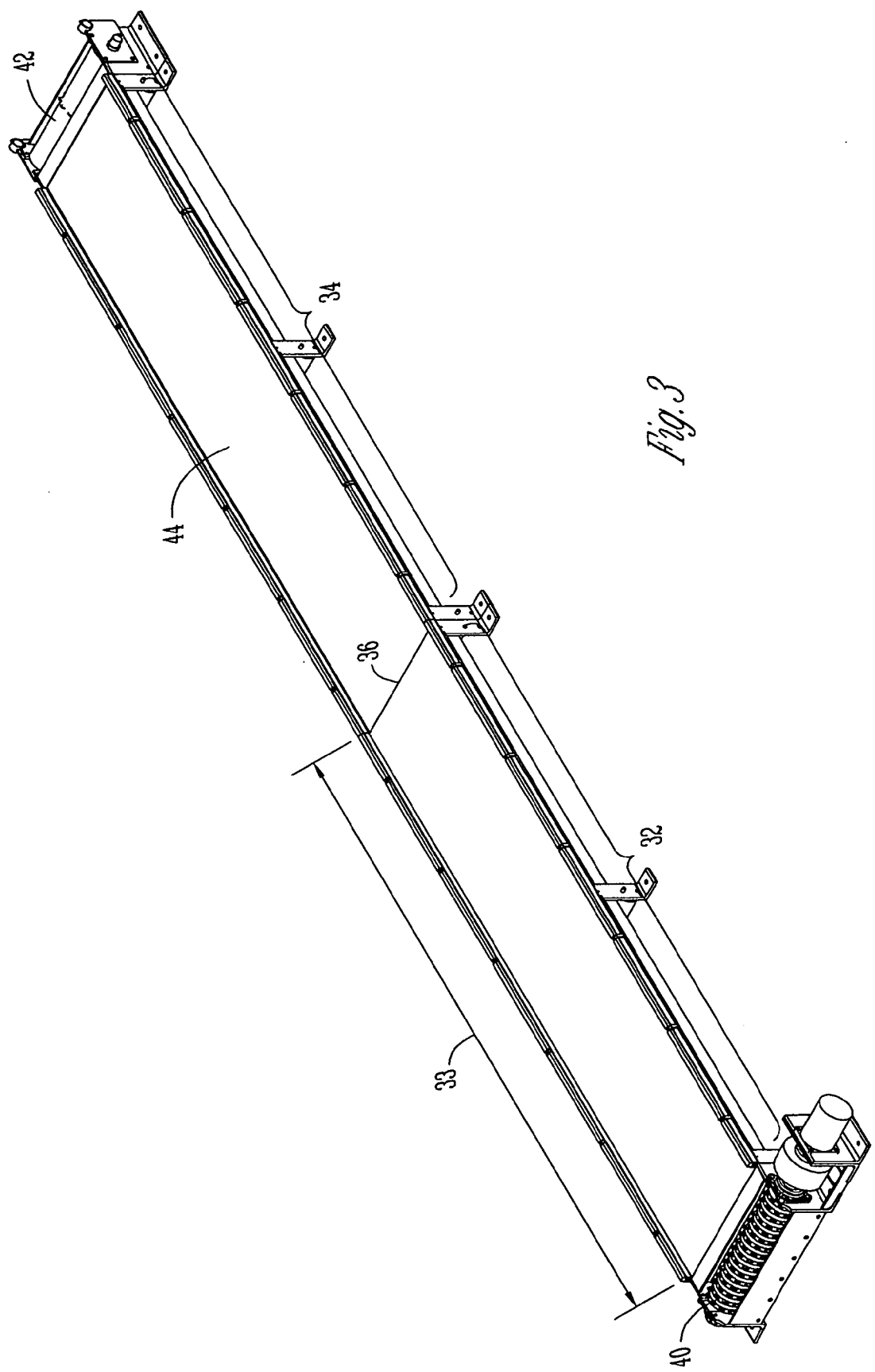
FIG. 3 illustrates a drawing of two modular sections, in accordance with one embodiment of the present invention

Referring to FIG. 3, as in one embodiment a first modular section 32 and a second modular section 34 have length 33. Length 33 may be 10, 20 or 30 feet but also length 33 may be in a range of 5 to 40 feet. First modular section 32 and second modular section 34 are used to efficiently install and uninstall the pair of launch conveyors 10 and the pair of drive conveyors 12. The first modular section 32 may be connected to the second modular section 34 at union 36. The first modular section 32 and second modular section 34 may have a universal end 40 or a single sprocket return 42. Steel deck 44 may be removable and may have a separate stainless steel wear surface.

Figure 4:
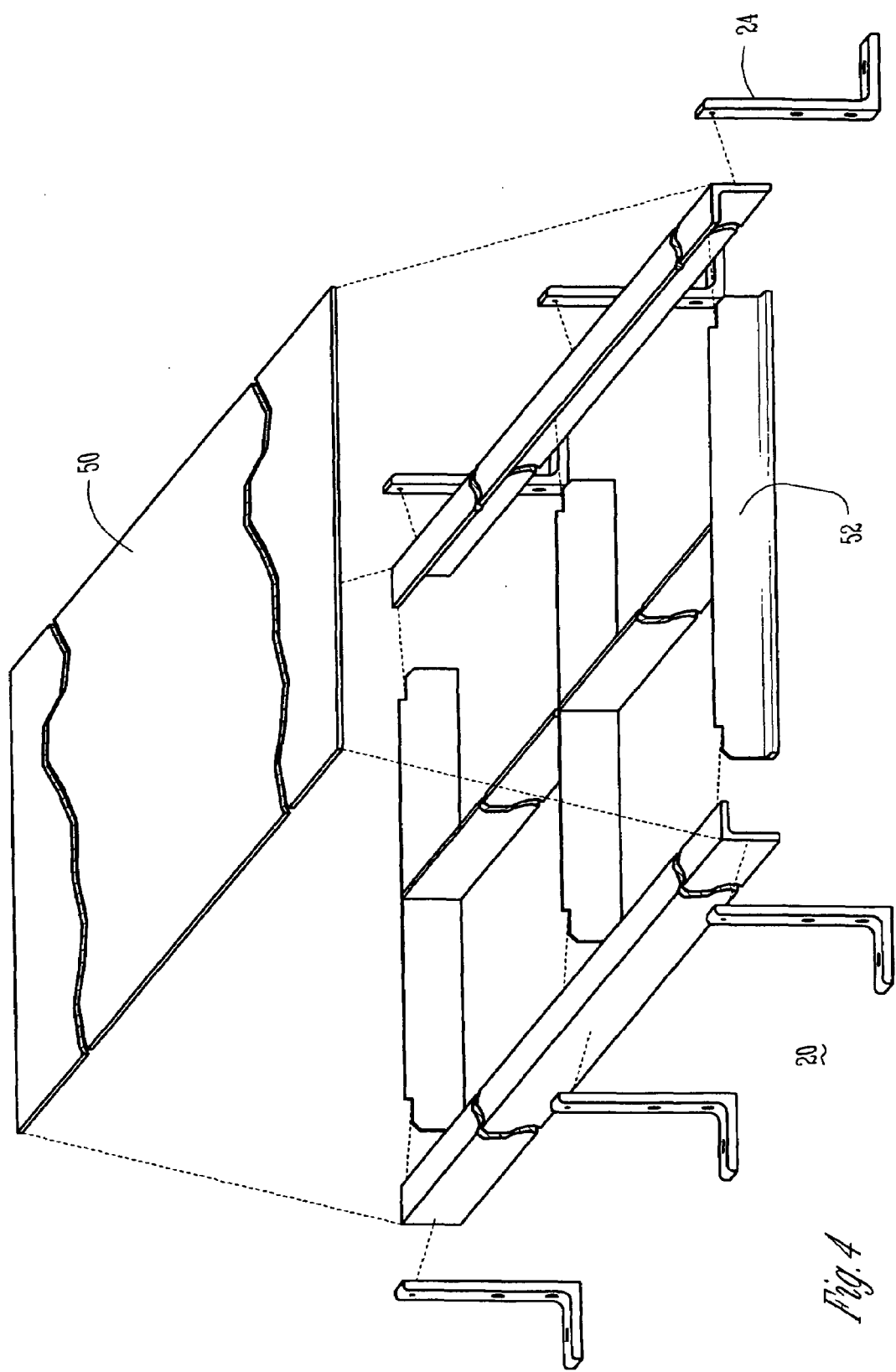
FIG. 4 illustrates a drawing of a ten foot section, in accordance with one embodiment of the present invention
Figure 5:
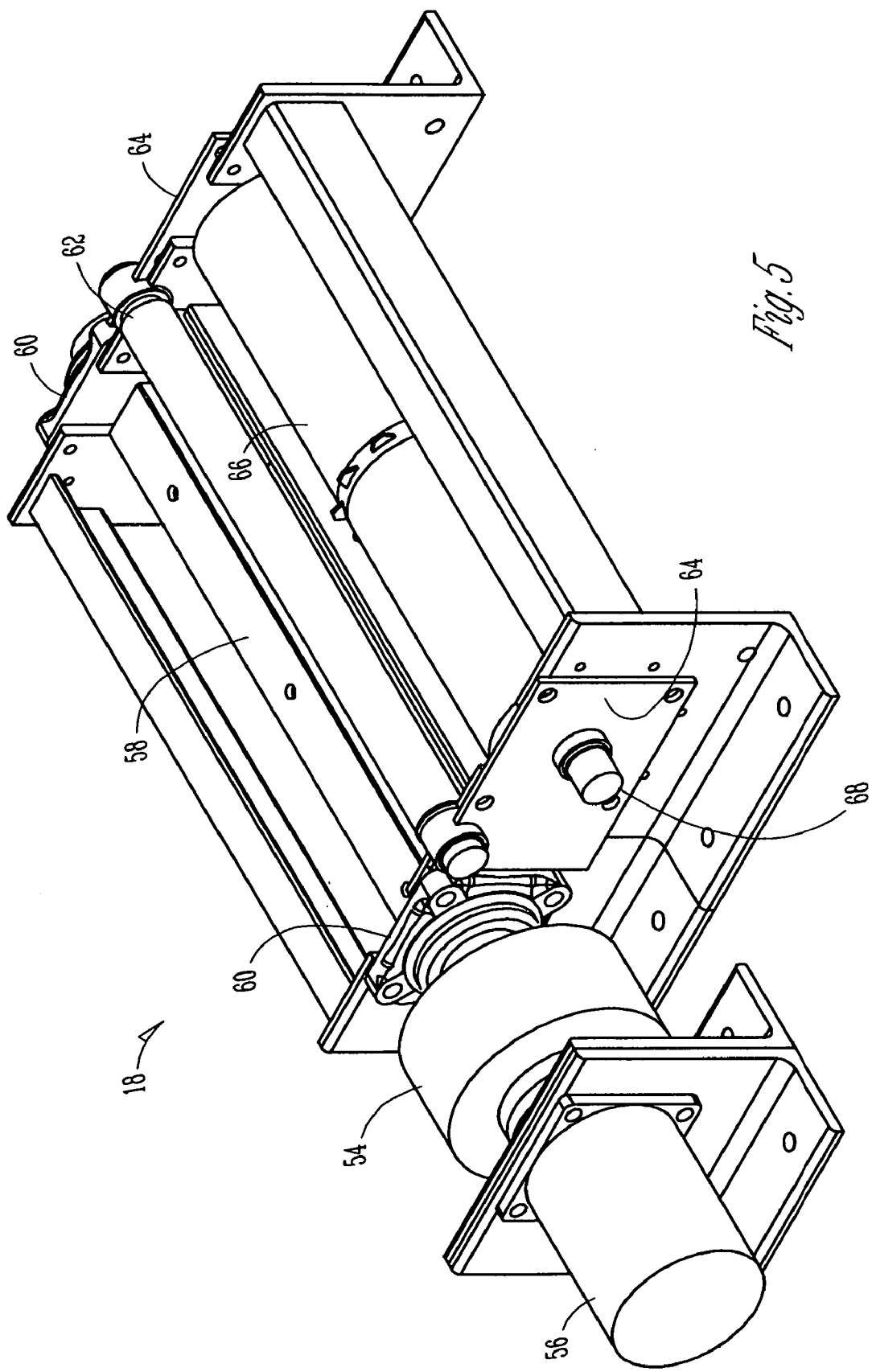
FIG. 5 illustrates a drawing of a transfer pair, in accordance with one embodiment of the present invention.

Referring to FIG. 4, an embodiment is illustrated having a flat plate 50. Flat plate 50 may be the same piece as steel deck 44 or flat plate 50 may be a separate piece. Flat plate 50 may be tack welded to a plurality of angle steel members 52. The plurality of angle steel members 52 are configured to hold the flat deck 50 and may be positioned from surface 20 by at least one support 24. Referring to FIG. 5, illustrated in one embodiment is a transfer pair 18. A shaft coupling 54 connects motor 56 to drive shaft 58. Drive shaft 58 is supported by two flange bearings 60. Transfer roller 62 is supported by two idler brackets 64. Idler roller 66 is supported by two pain bearings 68.

Thus, it can be seen from the above descriptions, flat belt modular conveyors to move vehicles have been described. While the present invention has been related in terms of the foregoing embodiments, those skilled in the art will recognize that the invention is not limited to the embodiments described. The present invention can be practiced with modification and alteration within the spirit and scope of the appended claims.

Thus, the description is to be regarded as illustrative instead of restrictive on the present invention.

What is claimed is:

1. A device comprising:
   at least one pair of conveyors adapted to receive a vehicle, the at least one pair of conveyors move the vehicle, the at least one pair of conveyors comprises: a pair of launch conveyors and at least one pair of drive conveyors, the pair of launch conveyers and the at least one pair of drive conveyors have a plurality of flat modular belts, each module belt has a width in the range of 6 to 20 inches.

2. A device comprising:
   at least one pair of conveyors adapted to receive a vehicle, the least one pair of conveyors move the vehicle, the at least one pair of conveyors comprises: a pair of launch conveyors and at least one pair of drive conveyors, the pair of conveyors are separated by a distance in the range of 20-36 inches.

3. A device comprising:
   at least one pair of conveyors adapted to receive a vehicle, the least one pair of conveyors move the vehicle, the at least one pair of conveyors comprise a pair of launch conveyors and the at least one pair of drive conveyors, the pair of conveyors are above the ground by a distance in the range of 1 to 9 inches.

4. The device of claim 3, wherein the pair of conveyors are in a parallel arrangement to each other and the vehicle is placed in park on the at least one pair of conveyors.

5. An apparatus comprising:
   a pair of launch conveyors accepting a parked vehicle, the pair of launch conveyors move the vehicle from no speed to a synchronous speed; and
   at least one pair of drive conveyors, the at least one pair of drive conveyors disposed about and in parallel alignment with the pair of launch conveyors, the at least one pair of drive conveyors transfer the vehicle off the pair of launch conveyors onto the at least one pair of drive conveyors, the at least one pair of drive conveyors are at the synchronous speed, the pair of launch conveyors and the pair of drive conveyors are separated by a distance in the range of 20-36 inches.

6. An apparatus comprising:
   a pair of launch conveyors accepting a parked vehicle, the pair of launch conveyors move the vehicle from no speed to a synchronous speed; and at least one pair of drive conveyors, the at least one pair of drive conveyors disposed about and in parallel alignment with the pair of launch conveyors, the at least one pair of drive conveyors transfer the vehicle off the pair of launch conveyors onto the at least one pair of drive conveyors, the at least one pair of drive conveyors are at the synchronous speed, the pair of launch conveyers and the pair of drive conveyors have a plurality of flat modular belts, each module belt has a width in the range of 6 to 20 inches.

7. An apparatus comprising:
   a pair of launch conveyors accepting a parked vehicle, the pair of launch conveyors move the vehicle from no speed to a synchronous speed; and
   at least one pair of drive conveyors, the at least one pair of drive conveyors disposed about and in parallel alignment with the pair of launch conveyors, the at least one pair of drive conveyors transfer the vehicle off the pair of launch conveyors onto the at least one pair of drive conveyors, the at least one pair of drive conveyors are at the synchronous speed, the pair of launch conveyors and the pair of drive conveyors are above the ground a distance in the range of 1 to 9 inches.

8. An apparatus comprising:
   a pair of launch conveyors accepting a parked vehicle, the pair of launch conveyors move the vehicle from no speed to a synchronous speed; and
   at least one pair of drive conveyors, the at least one pair of drive conveyors disposed about and in parallel alignment with the pair of launch conveyors, the at least one pair of drive conveyors transfer the vehicle off the pair of launch conveyors onto the at least one pair of drive conveyors, the at least one pair of drive conveyors are at the synchronous speed, the pair of launch conveyors and the pair of drive conveyors have a plurality of flat modular belts that use water to reduce friction.

\* \* \* \* \*